Aug. 19, 1969   R. A. DALY   3,461,902
VALVE LEVER AND LATCH MOUNTING MECHANISMS FOR
GLASSWARE FORMING MACHINE
Filed June 23, 1966   2 Sheets-Sheet 1

INVENTOR.
ROBERT A. DALY
BY
McCormick, Paulding & Huber
ATTORNEYS.

United States Patent Office 3,461,902
Patented Aug. 19, 1969

3,461,902
VALVE LEVER AND LATCH MOUNTING MECHANISMS FOR GLASSWARE FORMING MACHINE
Robert A. Daly, West Hartford, Conn., assignor to Emhart Corporation, Bloomfield, Conn., a corporation of Connecticut
Filed June 23, 1966, Ser. No. 559,947
Int. Cl. F16k 31/48
U.S. Cl. 137—315                    10 Claims This invention relates to glassware forming machines, and deals more particularly with improved mechanisms for mounting the various valve levers and their associated latches in a body for a bank of valves for such a machine.

The general object of the present invention is to provide improved valve lever and latch mounting mechanisms wherein individual levers and latches, or groups thereof, can be quickly removed for replacement or repair without disturbing adjacent levers and latches, and without disassembling a major part of the timing mechanism of a glassware forming machine, whereby the downtime of such machine is significantly reduced over that possible with prior art lever and latch mounting mechanisms.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Glassware forming machines generally, and more particularly the type of machine known to the trade as the Hartford I.S. machine, utilize a series of pneumatic control valves which are operated in sequence to perform various operations on a gob of glass in order to form the same into a glass bottle or the like. Each of these valves is typically operated by a valve lever which is pivotally mounted in the valve body, and has a latch associated therewith in order to retain the valve lever in position to hold a particular valve open or closed for predetermined times. A timing drum is rotatably supported beneath the levers, and their associated latches, and carries a plurality of camming buttons for sequentially operating said levers and latches. It should be noted that all of the levers and latches are subject to varying degrees of wear and it is an important feature of the present invention that one or more of these levers and latches can be conveniently removed for replacement or repair with a minimum downtime on the overall glassware forming machine.

Figure 1:
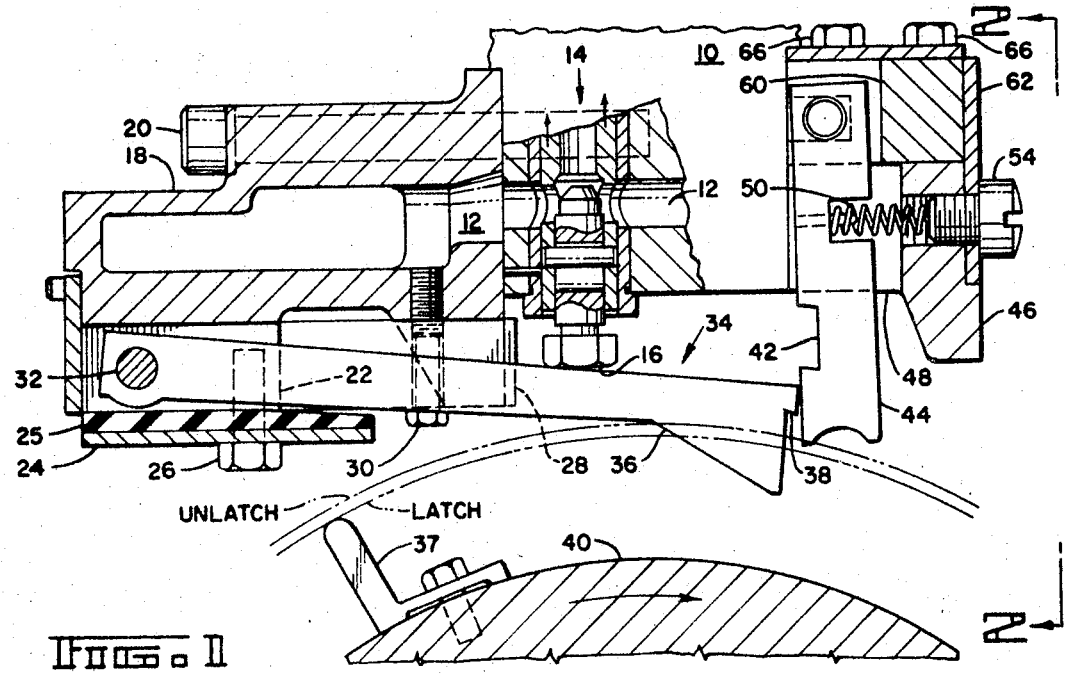
FIG. 1 is a vertical sectional view through the lower portion of the body for a bank of valves of a glassware forming machine showing the valve lever and latch mounting mechanisms of the present invention, and also showing a portion of the timing drum used to operate the levers and latches associated with the various valves in the bank.

Referring now more particularly to the drawings, FIG. 1 shows valve body or block 10, which is part of a valve bank, and which defines suitable internal passageways 12, 12 for carrying an operating fluid such as air to the various mechanisms of a glassware forming machine (not shown). Each such air passageway 12 has associated therewith a pneumatic control valve 14. An upper portion of the valve (not shown) may be moved vertically upwardly to an open position when an upward force is exerted on the lower tappet face 16 of the lower exhaust portion of the valve 14. It should be noted that only a portion of the valve body 10 is shown in section in FIG. 1, and that a plurality of such valves would normally be provided in longitudinally spaced relation in a typical Hartford I.S. machine.

Figure 2:
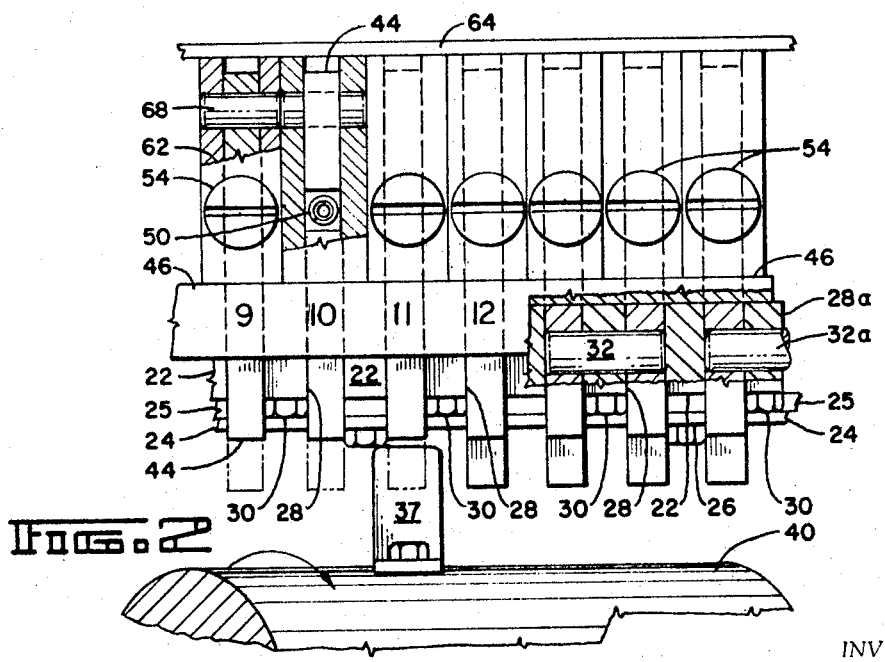
FIG. 2 is a front view of a portion of the valve bank body of FIG. 1 with parts thereof broken away to reveal the mechanisms for mounting the levers and latches.

The valve bank body includes a longitudinally extending exhaust manifold portion 18 which is attached to the valve bank body 10 by a plurality of screws, as indicated at 20. The manifold portion 18 comprises the lower rear part of the valve bank and includes several spaced apart depending legs 22 for supporting a bottom plate 24 and a resilient pad or cushion 25 as shown. Screws 26, 26 are received in aligned openings in the pad 25 and plate 24 and threadably received in some of the depending legs 22, 22 as best shown in FIG. 2. As so constructed, the plate 24 and its associated pad 25 will be seen to be spaced downwardly below the lower surface of the manifold portion 18 so as to provide a receptacle or space between adjacent legs for the lever mounting mechanism to be described.

Figure 3:
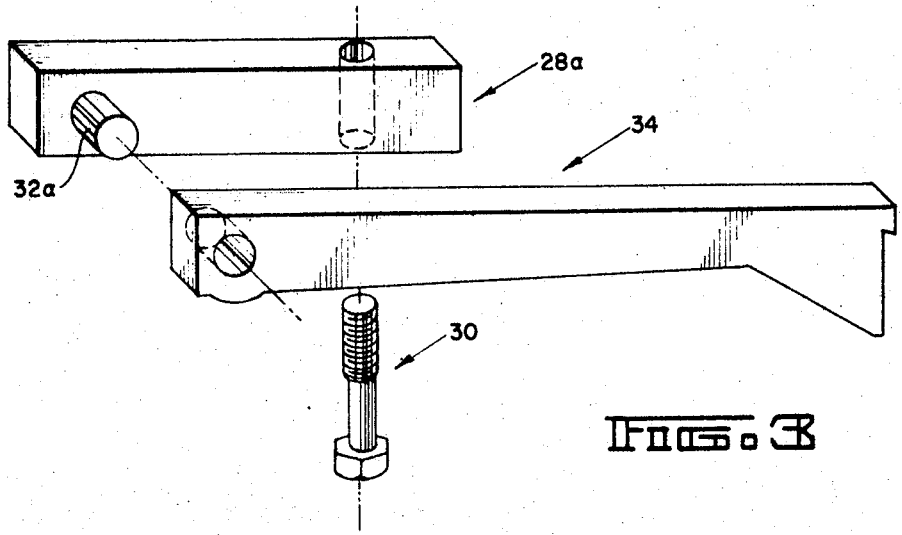
FIG. 3 is an exploded perspective view of a single lever together with its associated lever holder, and holder mounting screw.

In accordance with the present invention, a plurality of generally rectangular lever holders 28, 28 are arranged in the aforementioned space provided between the pad or cushion 25 and the lower side of the manifold portion 18 of the valve body, and each such lever holder 28 is secured in this position by a screw 30 which extends upwardly through an opening provided for this purpose in the holder 28. Each screw 30 is threadably received in a threaded opening provided for this purpose in the manifold portion 18 as shown. From FIG. 2 it will be seen that the lever holders 28, 28 are attached to the lower side of the manifold portion 18 of the valve body in spaced relation with the legs 22, 22 so as to provide a plurality of lever channels therebetween. As best shown in FIG. 3, each such lever holder 28 is provided with a pivot pin 32 which extends transversely across at least one adjacent lever channel defined between an adjacent lever holder 28 and a depending leg 22. From FIG. 2 it will be seen that the transversely extending pivot pin 32 may extend across both adjacent channels as shown or may extend across one such adjacent channel as indicated by the extreme right-hand holder 28a and its associated pivot pin 32a. It will of course be apparent that with a pivot pin such as that shown at 32, which does extend across both adjacent channels, the depending leg 22 serves to provide the proper spacing between levers.

From FIG. 3 it will be seen that a conventional valve operating lever 34 can be pivotally received on the pivot pin 32 or 32a provided for this purpose on the lever holder 28 or 28a. As so assembled, the resulting unit can be easily inserted into the position shown in FIGS. 1 and 2 and the screw 30 used to secure the entire unit to the manifold 18. The lever 34 is thus of conventional construction, being pivotally connected at its rear end portion to the valve body 10 in the novel manner just described. The lever 34 will be seen from FIG. 1 to have an intermediate portion for engaging the depending tappet 16 of the control valve 14, and a forward end 36 which is adapted to be cammed upwardly by a camming button 37 provided for this purpose or a rotary timing drum 40, which is driven by suitable means (not shown) in the direction indicated by the arrow in FIG. 1.

The lever 34 will be further seen to have a forward end 38 which is adapted to be received in a rearwardly facing notch 42 defined in a depending latch 44. The latch 44 is pivotally supported at its upper end by a suitable mounting mechanism to be described and has a lower end which is also adapted to be engaged by a rotating camming button (not shown) carried by the timing drum 40 so as to reclose the upper portion of the valve (not shown) and to reopen the lower exhaust portion after a predetermined dwell period. The buttons are generally L-shaped and attached to the timing drum 40 by suitable screws as shown.

Figure 4:
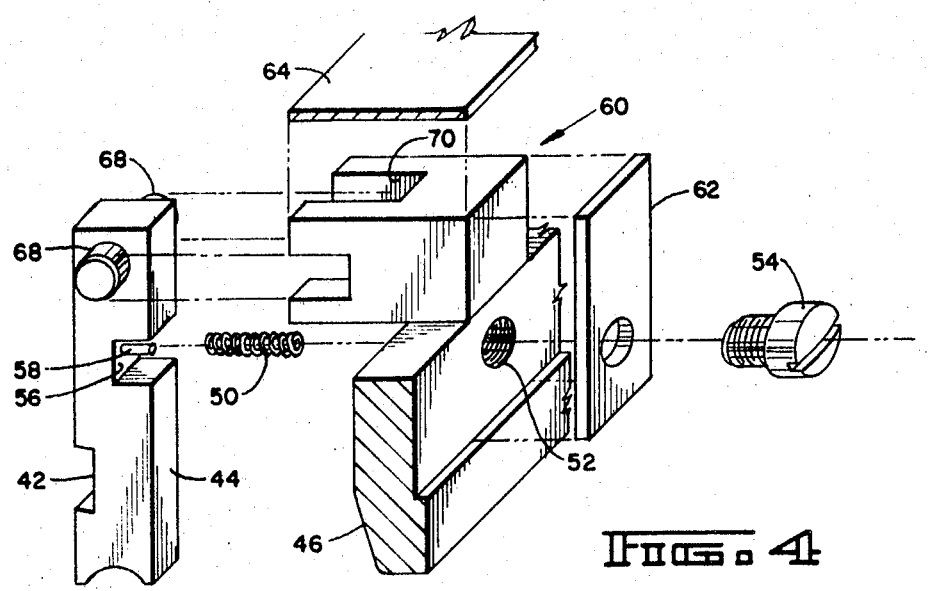
FIG. 4 is an exploded perspective view of a single latch together with its associated mounting mechanism.

Turning now to the means for pivotally mounting the various latches 44, 44 to the valve body 10, FIG. 1 shows a mounting rail 46 which extends longitudinally of the valve body 10 in forwardly spaced relation to the forward face thereof, being held in this position by the forwardly protruding legs 48, 48. FIG. 2 shows the mounting rail 46 partly broken away and FIG. 4 shows said mounting rail in exploded relation to one of the latches 44 together with the mechanism for pivotally mounting said latch in accordance with the present invention.

More particularly, the latch 44 has associated therewith a latch return spring 50 which is received in an opening 52 provided for this purpose in the mounting rail 46 so that the inner end of the spring 50 can act against the forward side of the latch. A screw 54 is threadably received in the forward end of the opening 52 and provides an abutment surface for the outer end of the spring 50. A locating socket for the inner end of the spring 50 is defined by a recess 56 in the latch and an associated pin 58 fixed to the latch 44 in generally centered relation in the recess 56.

In further accord with the present invention, a latch block 60 is associated with each latch 44 and is held in place by the same screw 54 used to retain the spring 50 in position for returning the latch as mentioned above. While the screw 54 does not directly engage the latch block 60 a latch cover plate 62 is associated with each latch block 60 so that a lower portion of said plate 62 engages the front of the mounting rail 46 and an upper portion engages the latch block 60 when the screw 54 is threadably received in its opening. Preferably, and as shown, a longitudinally extending top plate 64 is permanently mounted in fixed relation to the forwardly protruding legs 48, 48 of the valve body by suitable means such as the screws 66, 66 best shown in FIG. 1 in order to restrain the latch block against upward movement. The latch block 60 will be seen from FIG. 4 to have a bifurcated inner, or rear end portion, for receiving a transversely extending stud, or pivot pin 68 provided for this purpose at the upper end of the latch 44. The latch block shown also defines a suitable vertical notch 70 for receiving the upper end of the latch 44. It is an important feature of the latch mounting means shown that removal of the screw 54 permits its associated latch return spring 50 and the latch block 60 to be removed forwardly along with the cover plate 62. The latch 44 can thereafter be removed downwardly without disturbing the adjacent latches.

From the foregoing description it will be apparent that a worn latch can be conveniently removed for replacement or repair with a minimum downtime to the glassware forming machine. Similarly, a worn lever can be removed either singly, with its associated latch, or with its adjacent lever in the case of the paired construction with the associated latches.

The invention claimed is:

1. In a glassware forming machine of the type having a main valve body in which a plurality of control valves are arranged for timed operation in response to rotation of an adjacent timing drum, the combination comprising a plurality of valve operating levers, each of said levers having a first portion which is engageable with a tappet face on one of said valves and a second portion which is engageable by a camming button on said drum, a plurality of lever holders, means for detachably securing each of said holders to said valve body in spaced relation so as to provide channels therebetween for receiving end portions of said levers, a plurality of pivot pins carried by said holders, each of said pivot pins extending across at least one adjacent channel so as to pivotally receive at least one lever whereby any one of said holders and its associated lever can be conveniently removed from said valve body.

2. The combination set forth in claim 1 further characterized by a plurality of latches each of which defines a notch for selectively engaging one of said levers to hold said lever in an upwardly cammed or raised position, and a plurality of latch blocks each of which is detachably secured to said valve body for pivotally supporting one of said latches to permit the selective removal and replacement of said latches.

3. The combination set forth in claim 2 and further characterized by a latch block mounting rail attached to said valve body in forwardly spaced relation thereto so that each of said latches is pivotally supported in depending relation from its associated latch block, each of said latches having a lower end which is adapted to be engaged by a camming button on said timing drum for unlatching said raised lever after a predetermined dwell period.

4. The combination set forth in claim 3 and further characterized by a latch return spring associated with each latch for urging the same into engagement with its associated lever, said mounting rail having a plurality of openings therethrough for receiving said latch return springs, a plurality of screws threadably received in said rail openings for retaining said springs in said openings, a cover plate for each of said latches and having an opening through which an associated screw is received, and each of said cover plates having a portion for engaging and securing an associated said latch block in said detachable position when said associated screw is so received whereby removal of said screw permits the ready removal of said latch and its associated spring and latch block from said valve body.

5. The combination as set forth in claim 4 wherein each of said latches includes a transversely extending stud at its upper pivoted end, said stud being slidably and pivotally received in a transversely extending slot defined in its associated latch block.

6. The combination set forth in claim 1 wherein said means for detachably securing each of said lever holders to said valve body comprises a single screw extending therethrough so as to be threadably received in said valve body so that removal of said single screw permits the ready removal of at least one lever and its associated lever holder.

7. The combination set forth in claim 1 wherein at least some of said pivot pins extend across both adjacent channels so as to pivotally receive two levers located respectively in each of said adjacent channels whereby one of said holders and two of said levers can be conveniently removed from said valve body.

8. The combination set forth in claim 7 and further characterized by plate means attached to the underside of said valve body in downwardly spaced relation thereto to provide a support for said levers when said levers are in rest positions in said channels, said levers having their pivoted end portions located rearwardly of the portion of said plate means which engages said levers, said levers further including forwardly projecting free end portions which are adapted to be raised by said camming buttons for engagement with said valve tappets, said lever holders extending forwardly beyond said plate means, and said means for detachably securing said lever holders to said valve body comprising a plurality of screws, each of said screws extending through a forwardly extending portion of an associated lever holder so as to be threadably receivable in said valve body whereby removal of one of said screws permits two levers together with a lever holder to be readily removed.

9. The combination set forth in claim 8 further characterized by a plurality of latches at the front of said valve body, each of said latches defining a rearwardly open notch for selectively engaging the forward end of one of said levers to hold said lever in said raised position, and a plurality of latch blocks each of which is detachably secured to said valve body and pivotally supports one of said latches in a depending position so that a lower end of said latch is adapted to be engaged by a camming button on said timing drum for releasing said raised lever after a predetermined dwell period.

10. The combination set forth in claim 9 further characterized by a mounting rail attached to said valve body in forwardly spaced relation thereto for supporting said latch blocks, a plurality of latch return springs received in openings in said rail, a plurality of screws threadably received in said rail openings for retaining said springs in position to urge said latches into engagement with said raised levers, a cover plate for each of said latches having an opening in its lower portion to receive an associated latch spring retaining screw, each of said cover plates having an upper portion for engaging an associated latch block and securing said latch block when said screw is so received, whereby removal of one of said screws permits the ready removal of one latch and its associated spring and latch block.

References Cited

UNITED STATES PATENTS

| | | | |
|---|---|---|---|
| 2,551,445 | 5/1951 | Lindsay | 137—624.22 |
| 2,837,118 | 6/1958 | Allen | 137—624.22 X |
| 3,211,168 | 10/1965 | Irwin | 137—315 |
| 3,246,668 | 4/1966 | Hirsch | 137—315 |

CLARENCE R. GORDON, Primary Examiner

U.S. Cl. X.R.

137—624.18